Jan. 19, 1954  G. A. BOECK ET AL  2,666,344
GEAR SYSTEM
Filed Dec. 7, 1951  2 Sheets-Sheet 1
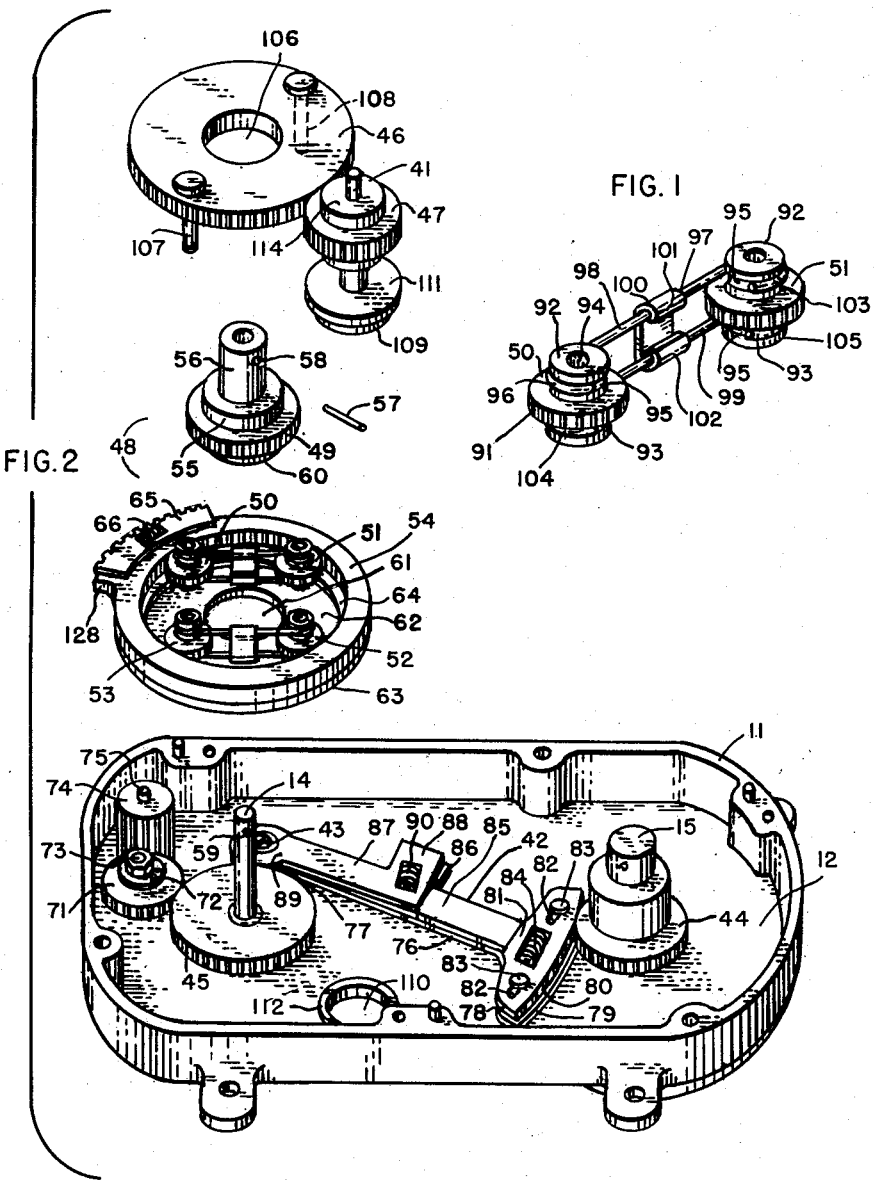
INVENTORS
G. A. BOECK
EDSON J. HOWARD
BY
Harry M. Saragovitz
ATTORNEY Jan. 19, 1954   G. A. BOECK ET AL   2,666,344
GEAR SYSTEM
Filed Dec. 7, 1951
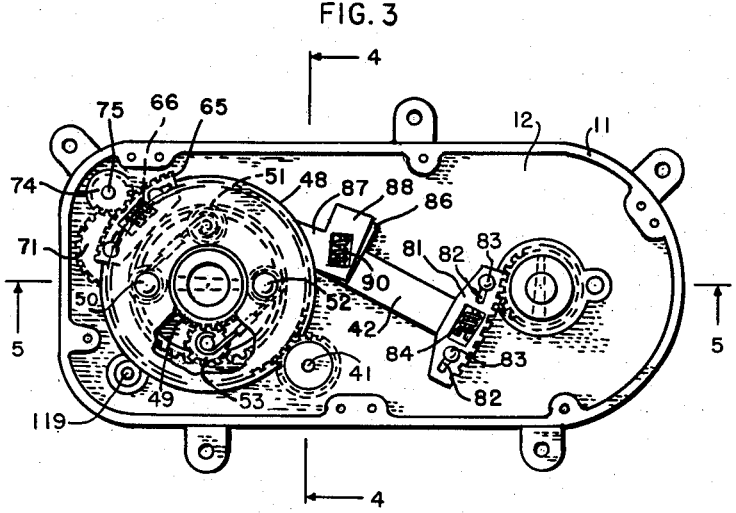
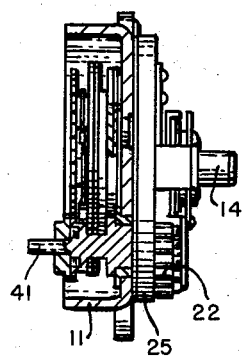
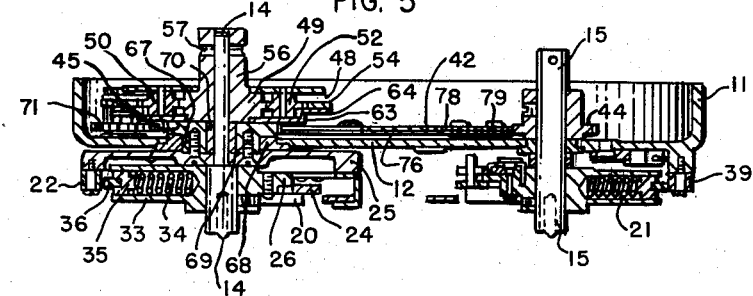
INVENTORS
G. A. BOECK
EDSON J. HOWARD
BY
Harry M. Saragovitz
ATTORNEY Patented Jan. 19, 1954

2,666,344

UNITED STATES PATENT OFFICE 2,666,344

GEAR SYSTEM

Gunther A. Boeck, Mountain Lakes, N. J., and Edson J. Howard, Flushing, N. Y., assignors, by mesne assignments, to the United States of America as represented by the Secretary of the Army Original application August 14, 1950, Serial No. 179,334. Divided and this application December 7, 1951, Serial No. 260,492

2 Claims. (Cl. 74—801)

The present application is related to Patent No. 2,479,465 dated August 16, 1949 issued in the name of the present applicants and assigned to the Bell Telephone Laboratories, Inc., in that the claims herein are claims cancelled, pursuant to a requirement of division, from the application filed August 14, 1950, Serial Number 179,334, which application is a division of the patent indicated above.

This invention relates to control devices and more particularly to control devices operable to control a plurality of rotatable members such for instance as the rotor shafts of a plurality of variable electrical devices.

The feature of the invention resides in a planetary gear means.

In the drawings:

Fig. 1 is a view, in perspective, of a planet gear means forming part of the invention;

Fig. 2 shows the body of the control device with certain parts mounted therein and certain other parts of the control device exploded out of the body;

Fig. 3 is a plan view, in reduced scale, of the control device minus the back cover plate and shows parts mounted in the body;

Fig. 4 is a view, partly in section, of the control device and taken on the line 7—7 in Fig. 3;

Fig. 5 is a view, partly in section, of the control device and taken on the line 8—8 in Fig. 3.

A planetary gear drive 48 comprising a sun gear 49, paired planet gears 50 and 51 and 52 and 53 and a ring gear 54 are provided in the control device. The sun gear 49, as shown in Fig. 2, is integral with or is secured on an enlarged portion 55 of a tubular shaft 56 through the bore of which the shaft 14 may extend, the shaft 14 and the tubular shaft 56 being secured against relative rotation by means of a pin 57 extending through a transverse aperture 58 in the tubular shaft 56 and a transverse aperture 59 in the shaft 14. The lower end 60 of the tubular shaft 56 is dimensioned to fit into an aperture 61 formed in the center of a recessed portion 62 of a plate 63, the flange 64 of which is wider than the ring gear 54, the outside diameter of the plate 63 being equal to the outside diameter of the ring gear 54, the teeth of the ring gear 54 being on the inside of the ring gear 54. A segment gear comprising a toothed enlargement 64 on the ring gear 54 and an overlying and apertured toothed segment plate 65, shiftable relative to the enlargement 128 against the action of a spring 66, are provided as an anti-backlash gear portion on the ring gear 54. The plate 63 is designed to rest on the gear 45 shown in Fig. 2, the gear 45 as shown in Fig. 5 having a hub portion 67 journalled in a flanged bearing 68 supported in an apertured portion of the front wall 12 of the body 11. The hub portion 67 of the gear 45 is secured by means of screws 69 to the cup-type support 25 of the detent means 20. The shaft 14 is journalled in a bearing 70 in the gear 45.

The gear 45 may rotate on the sahft 14 and is in mesh with an idler gear 71 rotatably supported on a bearing 72 supported on a bolt 73 mounted in the body 11. The idler gear 71 is in mesh with a relatively wide pinion 74 rotatably supported on a shaft 75 mounted in the body 11. The pinion 74 is in mesh with the toothed enlargement 64 and the toothed segment plate 65 on the ring gear 54.

The rocker arm 42 is T-shaped in form and serves as a mechanical driving means between the gear 44 secured on the shaft 15 and the gear 45 rotatably mounted on the shaft 14. One end of the body portion 76 of the rocker arm 42 terminates in an apertured, enlarged and circular end portion 77 forming the pivotally supported end of the rocker arm 42. The other end of the body portion 76 terminates in the cross-arm portion 78 carrying an attached segment plate 79 extending under the gear 44. The cross-arm portion 78 is constructed to provide an anti-backlash gear segment 80 in mesh with the gear 44, the anti-backlash gear segment 80 comprising the cross-arm portion 78 equipped with teeth, and a second segment 81 equipped with teeth and overlying the cross-arm portion 78. The second segment 81 is shiftable on and relative to the cross-arm portion 78 and is provided with elongated apertures 82 accommodating mounting pins 83 mounted on the cross-arm portion 78 and extending through the second segment 81. A spring 84 is provided to constantly urge the second segment 81 lengthwise and relative to the cross-arm portion 78 to prevent lost motion between the gear 44 and the rocker arm 42.

Secured to and overlying the body portion 76 of the rocker arm 42 is a bar 85 having an apertured enlargement 86. Overlying the bar 85 is an apertured arm 87 pivotally supported at 43 and having an apertured enlargement 88. The pivotally supported end of the bar 87 has a gear portion 89 the teeth of which are in mesh with the gear 45. A spring 90 engaging the apertured enlargements 86 and 88 urges the bar 87 relative to the rocker arm 42 to prevent lost motion between the rocker arm parts and the gear 45.

When the shaft 15 is rotated the gear 44 pivotally moves the rocker arm 42 to rotate the gear 45 which is in driving connection with the ring gear 54 through the gear 71, pinion 74 and segment portion 64 and plate 65 on the ring gear 54. If the shaft 15 is held against rotation the ring gear 54 and the gear 45 cannot rotate.

The sun gear 49 in the planetary gear means 48 is constructed and arranged to mesh with the planet gears 50, 51, 52 and 53 which are arranged in pairs and to mesh with the teeth on the inner circular part of the ring gear 54. The paired arrangement of the planet gears is clearly shown in Fig. 3 which shows one pair of the planet gears comprising the planet gears 50 and 51 supported in spaced relation. The planet gears are constructed alike and the description of one will be sufficient for an understanding of the structure of all. The planet gear 50 comprises a gear wheel portion 91 having apertured hub portions 92 and 93 extending from opposite faces of the portion 91 and defining an aperture 94. Each hub portion 92 and 93 has an annular groove 95 formed in the outer cylindrical surface to receive a hook-shaped end 96 of a spring wire support 97 comprising a pair of spring wires 98 and 99 held in parallel spaced relation by a clip 100, end portions 101 and 102 of which are bent around the respective spring wires 98 and 99. One end of the spring wire 98 extends into the groove 95 in the hub portion 92 of the planet gear 50 and the hook portion 96 is made to loosely embrace the hub portion 92 and so that the hub portion 92 is in effect, journalled in the hook portion 96. The other end of the spring wire 98 extends into the groove 95 in the hub portion 92 of the planet gear 51 and has a hook portion 103 located in the groove 95 and loosely embracing the hub portion of the planet gear 51. The spring wire 99 is formed like the spring wire 98 and has hook-shaped end portions 104 and 105, the hook-shaped end portion 104 loosely embracing the hub portion 93 of the planet gear 50 and the hook-shaped end portion 105 loosely embracing the hub portion 93 of the planet gear 51, each hook-shaped end portion resting in a groove 95 in the hub portion embraced. It will be seen as shown in Fig. 1 that the planet gears 50 and 51 are held in spaced relation by the spring wires 98 and 99 and that normally the major portions of the spring wires 98 and 99 extend in straight lines from the planet gear 50 to the planet gear 51. The planet gears 52 and 53 are constructed and mounted on spring wire members 98 and 99 in the same manner as the planet gears 50 and 51. The distance from center to center of a pair of planet gears mounted on the spring wires 98 and 99, the diameter of the sun gear 49 and the inside diameter of the ring gear 54 are such that when the planet gears 50, 51, 52 and 53 are set into the ring gear 54 as shown in Fig. 4 and the sun gear 49 is entered in the ring gear 54 in required position as shown in Fig. 6 the spring wire supports of the planet gears involving the spring wires 98 and 99 are bowed slightly outward relative to the axis of the sun gear 49. The spring pressure developed in the spring wires 98 and 99 by reason of the bowing thereof helps to keep the planet gears 50, 51, 52 and 53 in true mesh with the ring gear 54 and the sun gear 49 and ring gear 54 in the same position in regard to each other, thus eliminating backlash between them.

What is claimed is:

1. A planetary gear system comprising, in combination, a sun gear, a ring gear concentric with said sun gear, a pair of planet gears in gear connection with said sun gear and said ring gear and a flexible supporting means for said planet gears comprising a pair of parallel spaced spring wires, said wires having hooked shaped end portions which respectively embrace said planet gears operating to hold said planet gears in spaced relation.

2. A planetary gear system comprising in combination a sun gear, a ring gear concentric with said sun gear, and a pair of planet gears in gear connection with said sun gear and said ring gear, each of said planet gears comprising a gear wheel portion and hub portions extending from the opposite faces of said gear wheel portion, each of said hub portions being provided with an annular groove formed in its outer cylindrical surface and means for supporting said planet gears comprising a pair of parallel spaced spring wires, each of said wires having their ends terminating in hooked shaped portions, the hooked shaped portions of one pair of said ends of said wires embracing said annular grooves of one of said planet gears, the other ends of said wires embracing the annular grooves of the other said gear.

GUNTHER A. BOECK.
EDSON J. HOWARD.

References Cited in the file of this patent

UNITED STATES PATENTS

| Number | Name | Date |
|---|---|---|
| 2,479,465 | Boeck et al. | Aug. 16, 1949 |

FOREIGN PATENTS

| Number | Country | Date |
|---|---|---|
| 721,714 | Germany | May 7, 1942 |